United States Patent
Wei (10) Patent No.: US 10,162,790 B2
(45) Date of Patent: Dec. 25, 2018

(54) METHOD FOR CLOCK SYNCHRONIZATION OF AN INDUSTRIAL INTERNET FIELD BROADBAND BUS

(71) Applicant: KYLAND TECHNOLOGY CO., LTD., Beijing (CN)

(72) Inventor: Jinju Wei, Beijing (CN)

(73) Assignee: KYLAND TECHNOLOGY CO., LTD., Beijing (CN)

( * ) Notice: Subject to any disclaimer, the term of this patent is extended or adjusted under 35 U.S.C. 154(b) by 190 days.

(21) Appl. No.: 15/264,033

(22) Filed: Sep. 13, 2016

(65) Prior Publication Data

US 2017/0371832 A1 Dec. 28, 2017

(30) Foreign Application Priority Data

Jun. 23, 2016 (CN) .......................... 2016 1 0466739

(51) Int. Cl.
*G06F 13/42* (2006.01)
*H04J 3/06* (2006.01)
(Continued)

(52) U.S. Cl.
CPC ............ *G06F 13/4291* (2013.01); *G06F 1/12* (2013.01); *G06F 13/364* (2013.01);
(Continued)

(58) Field of Classification Search
None
See application file for complete search history.

(56) References Cited

U.S. PATENT DOCUMENTS 7,339,924 B1 * 3/2008 Chung ................ H04L 12/4633
370/356
7,616,646 B1 * 11/2009 Ma ...................... H04L 12/2896
370/392
(Continued)

FOREIGN PATENT DOCUMENTS

CN 103532692 A 1/2014
CN 105450384 A 3/2016

OTHER PUBLICATIONS

Hyung-Taek et al., "IEEE 802.1AS Time Synchronization in a switched Ethernet based In-Car Network," Vehicular Networking Conference (VNC), Nov. 2011, pp. 147-154.

*Primary Examiner* — Henry Tsai
*Assistant Examiner* — Aurangzeb Hassan
(74) *Attorney, Agent, or Firm* — Arent Fox LLP (57) ABSTRACT

Disclosed is a method for clock synchronization of an industrial internet field broadband bus, wherein the method is applicable to an industrial internet field broadband bus architecture system including a bus controller and at least one bus terminal, the bus controller is connected with the bus terminal over a two-wire data transfer network, and the method includes steps of: electing one of the bus controller and the bus terminal as a best master clock; determining whether an IP address of the device of the best master clock is the same as an IP address of the bus controller; if so, then determining the bus controller as a master device of clock synchronization, and transmitting by the bus controller a synchronization message to the bus terminal for clock synchronization; and otherwise, returning to the step of electing one of the bus controller and the bus terminal as the best master clock.

18 Claims, 4 Drawing Sheets

(51) Int. Cl.
*H04L 12/403* (2006.01)
*G06F 1/12* (2006.01)
*G06F 13/364* (2006.01)
*G06F 13/40* (2006.01)

(52) U.S. Cl.
CPC .......... *G06F 13/404* (2013.01); *H04J 3/0641* (2013.01); *H04J 3/0667* (2013.01); *H04L 12/4035* (2013.01)

(56) References Cited

U.S. PATENT DOCUMENTS

| | | | |
|---|---|---|---|
| 2002/0010518 A1* | 1/2002 | Reid | G06Q 10/087 700/31 |
| 2007/0027485 A1* | 2/2007 | Kallmyer | A61N 1/372 607/2 |
| 2015/0003443 A1 | 1/2015 | Koenigseder et al. | |
| 2015/0089080 A1* | 3/2015 | Alsup | H04L 49/90 709/235 |
| 2016/0072929 A1* | 3/2016 | Alsup | H04L 12/40156 370/392 |

* cited by examiner

Fig.6

METHOD FOR CLOCK SYNCHRONIZATION OF AN INDUSTRIAL INTERNET FIELD BROADBAND BUS

CROSS-REFERENCE TO RELATED APPLICATIONS

This application claims the priority to Chinese Patent Application No. 201610466739.0, filed on Jun. 23, 2016, the content of which is hereby incorporated by reference in its entirety.

FIELD

The present disclosure relates to the field of data transmission, and particularly to a method for clock synchronization of an industrial internet field broadband bus.

BACKGROUND

A serial bus system has been increasingly applied in automation and manufacturing technology, where all users are connected by a serial bus into a network, and data are exchanged over the bus in a master-slave mode. Highly precise clock synchronization at a low cost and with high compatibility is a crucial issue in the fields of industry automation, distributed instrument control, and real-time data acquisition, for example, strict clock synchronization is required for a high-speed and high-precision multi-axis motion control system in that real-time data transmission is guaranteed primarily by clock synchronization. In an existing solution for clock synchronization in an industrial internet field broadband bus architecture system, the best master clock is elected periodically from the architecture system in such an algorithm that any one clocks in the bus system can act as the master clock so that may be adjusted periodically.

SUMMARY

Embodiments of the disclosure provide a method for clock synchronization of an industrial internet field broadband bus so as to address the problem an instable system clock in the existing solution for clock synchronization in an industrial internet field broadband bus architecture system.

Some embodiments of the disclosure provide a method for clock synchronization of an industrial internet field broadband bus, wherein the method is applicable to an industrial internet field broadband bus architecture system including a bus controller and at least one bus terminal, the bus controller is connected with the bus terminal over a two-wire data transfer network, and the method includes the steps of:

electing one of the bus controller and the bus terminal as a best master clock;

determining whether an IP address of the device of the best master clock is the same as an IP address of the bus controller;

if so, then determining the bus controller as a master device of clock synchronization, and transmitting by the bus controller a synchronization message to the bus terminal for clock synchronization; and otherwise, returning to the step of electing one of the bus controller and the bus terminal as the best master clock.

BRIEF DESCRIPTION OF THE DRAWINGS

In order to make the technical solutions according to embodiments of the disclosure or in the prior art more apparent, the drawings to which a description of the embodiments or the prior art refers will be briefly introduced below, and apparently the drawings to be described below are merely illustrative of some of the embodiments of the disclosure, and those ordinarily skilled in the art can derive from these drawings other drawings without any inventive effort. In the drawings.

DETAILED DESCRIPTION OF THE EMBODIMENTS

In order to make the objects, technical solutions, and advantages of embodiments of the disclosure more apparent, the technical solutions according to the embodiments of the disclosure will be described below clearly and fully with reference to the drawings in the embodiments of the disclosure, and apparently the embodiments described below are only a part but not all of the embodiments of the disclosure. Based upon the embodiments here of the disclosure, all the other embodiments which can occur to those skilled in the art without any inventive effort shall fall into the scope of the disclosure.

Figure 1:
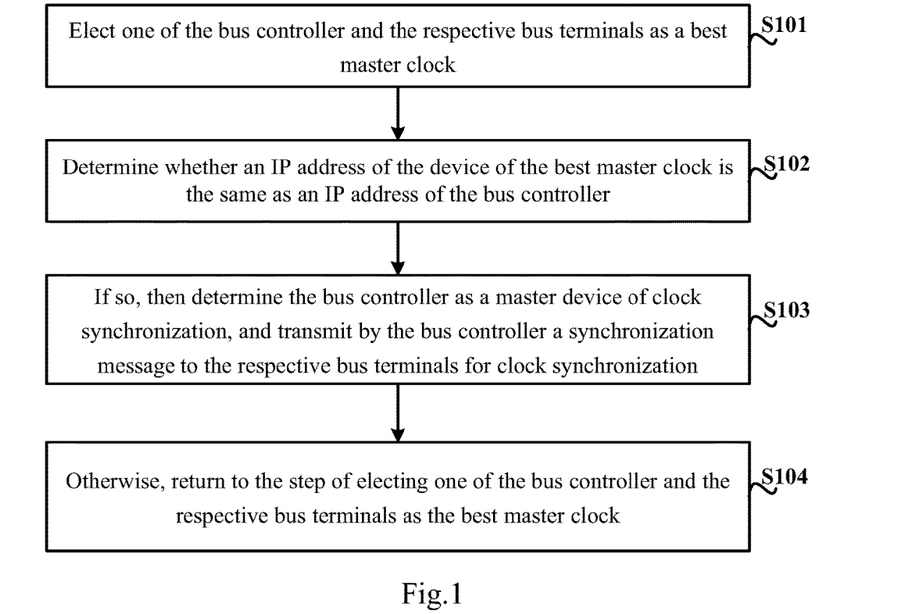
FIG. 1 illustrates a schematic flow chart of a method for clock synchronization of an industrial internet field broadband bus according to some embodiments of the disclosure.

Referring to FIG. 1 illustrating a schematic flow chart of a method for clock synchronization of an industrial internet field broadband bus according to some embodiments of the disclosure, the method includes the following steps:

The step S101 is to elect one of the bus controller and the respective bus terminals as a best master clock;

The step S102 is to determine whether an IP address of the device of the best master clock is the same as an IP address of the bus controller;

The step S103 is, if so, to determine the bus controller as a master device of clock synchronization, and to transmit by the bus controller a synchronization message to the respective bus terminals for clock synchronization; and The step S104 is, if not, to return to the step of electing one of the bus controller and the respective bus terminals as the best master clock.

Figure 2:
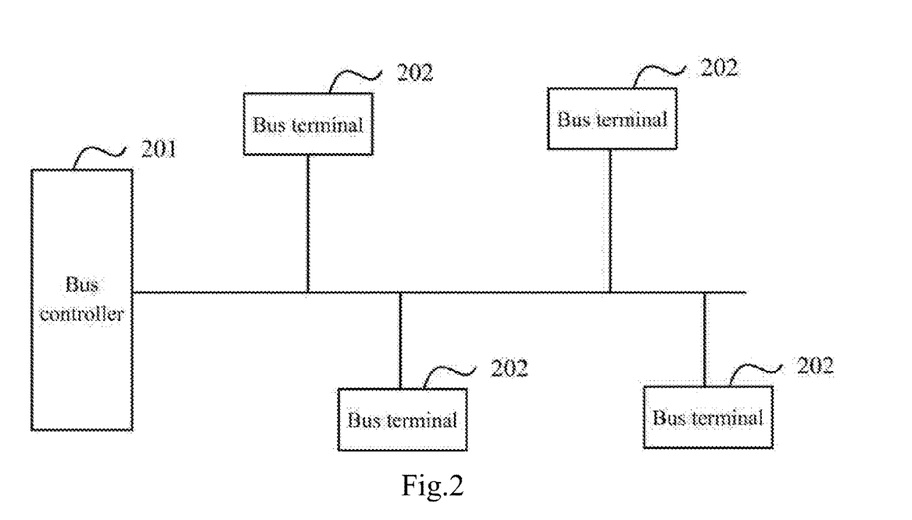
FIG. 2 illustrates a schematic structural diagram of an industrial internet communication system according to some embodiments of the disclosure.

Referring to FIG. 2 illustrating a schematic structural diagram of the industrial internet field broadband bus architecture system according to some embodiments of the disclosure, which includes a bus controller 201 and at least one bus terminal 202, and the bus controller 201 is connected with the respective bus terminals 202 over a two-wire data transfer network, where:

The bus controller 201 is synchronized in clock with the respective bus terminals 202 through a precise clock synchronization protocol; and a transmission period available over the bus in the two-wire data transfer network is segmented into synchronization time slices and data time slices, and the bus controller allocates the data time slices for the bus controller and the respective bus terminals. The bus controller 201 and the respective bus terminals 202 transmit data in their respective data time slices to thereby ensure timely and temporally deterministic data transmission.

In order to facilitate further understanding of the industrial internet field broadband bus architecture system according to some embodiments of the disclosure, some embodiments of the disclosure will be further described below.

Here in some embodiments, in a real application, data over a broadband bus can include real-time data and non-real-time data, where the real-time data require highly temporally deterministic and timely data transmission, and the non-real-time data require less temporally deterministic and timely data transmission, so that in some embodiments of the disclosure, the data can be segmented in advance into real-time data and non-real-time data so that different transmission strategies are applied to the different data.

The bus controller 201 is further configured to acquire the data, and then determine whether the data are real-time data or non-real-time data; and if the data are real-time data, then the bus controller will store the real-time data into a first real-time data container; otherwise, the bus controller will store the non-real-time data into a first non-real-time data container; and The respective bus terminals 202 is further configured to acquire the data, and then determine whether the data are real-time data or non-real-time data; and if the data are real-time data, then the bus terminals will store the real-time data into a second real-time data container; otherwise, the bus terminals will store the non-real-time data into a second non-real-time data container In the step S101, one of the bus controller and the respective bus terminals can be elected as the device of the best master clock by the best master clock algorithm in the IEEE1588 clock protocol.

Figure 3:
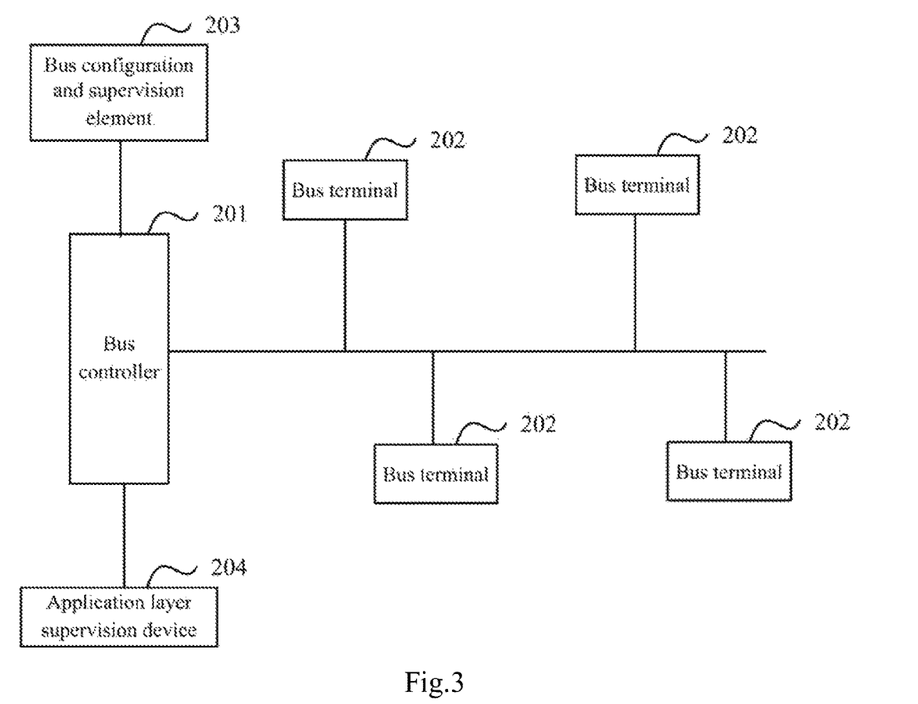
FIG. 3 illustrates a schematic diagram of an industrial internet field broadband bus architecture according to some embodiments of the disclosure.

Furthermore FIG. 3 illustrates a schematic diagram of an industrial internet field broadband bus architecture according to some embodiments of the disclosure, which includes a bus controller 201 and at least one bus terminal 202, and the bus controller 201 is connected with the respective bus terminals 202 over a two-wire data transfer network, where:

The system further includes: a bus configuration and supervision element 203 connected with the bus controller 201, configured to transmit configuration information or a supervision instruction for at least one device over the two-wire data transfer network to the bus controller 201 so that the bus controller 201 transmits the configuration information to the corresponding device, and to receive operating state information, transmitted by the bus controller, generated by at least one device over the two-wire data transfer network; and an application layer supervision device 204 connected with the bus controller 201, configured to acquire the data and control in a real-time manner the bus controller 201 and the respective bus terminals 202.

In view of the drawback of an instable system clock in the prior art, in some embodiments of the disclosure, an IP address is checked after a device acting as the best master clock is elected each time, and the IP address of the device of the best master clock is transmitted to the bus controller, and the bus controller compares the IP address of the device of the best master clock with the IP address of the bus controller for consistency; or The device of the best master clock compares its own IP address with an IP address of the bus controller for consistency.

That is, if the elected device of the best master clock is one of the bus terminals 202, then the bus terminal 202 can transmit its own IP address to the bus controller, and the bus controller can compare the IP address of the bus terminal 202 with the IP address of the bus controller for consistency; or the system can alternatively transmit in advance the IP address of the bus controller to the respective bus terminals 202, and then if the elected device of the best master clock is one of the bus terminals 202, then the bus terminal 202 can compare directly its own IP address with the IP address of the bus controller for consistency.

Moreover in view of such temporal instability of a clock source for the bus controller that the bus controller fails to be elected as the best master clock for a number of times, if the best master clock is elected for a number of times above a preset threshold, then the best master clock will be stopped from being elected, and the bus controller will transmit an alarm for calibrating the clock source.

For example, the bus controller determines whether it is finally elected as a master clock, and if not, then the bus controller will determine whether the master clock is elected for a number of times above the preset threshold which can be manually preset empirically, and if so, then the bus controller will transmit a master clock alarm to notify an administrator that the bus controller needs to calibrate or replace the externally connected clock source, and the master clock will not be elected while the master clock alarm is being transmitted.

Furthermore a transmission period of time available over a bus in the two-wire data transfer network is segmented into synchronization time slices and data time slices;

The synchronization message is transmitted by the bus controller to the respective bus terminals for clock synchronization as follows: the bus controller transmits the synchronization message to the respective bus terminals in the synchronization time slices, where the synchronization message carries a timestamp concerning when the synchronization message, so that the respective bus terminals are synchronized in clock according to the timestamp, where the timestamp is derived using the clock of the bus controller.

Figure 4:
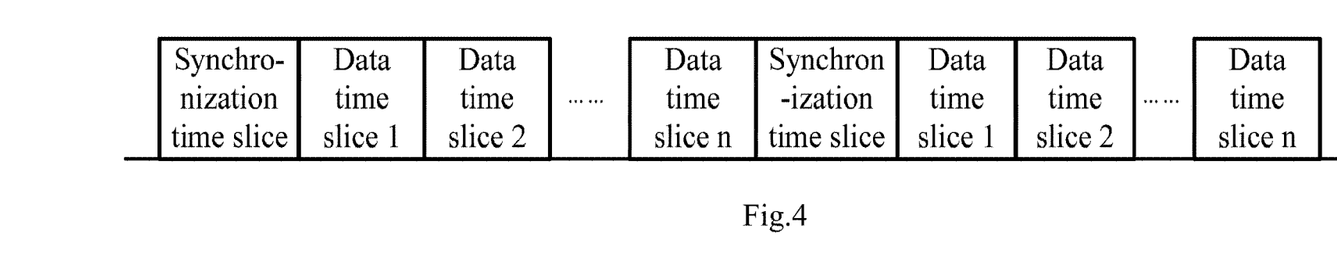
FIG. 4 illustrates time slices of a transmission period available over the bus according to some embodiments of the disclosure.
Figure 5:
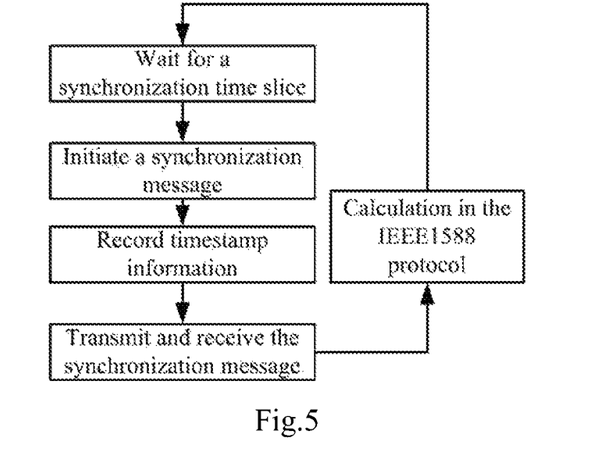
FIG. 5 illustrates an implementation of clock synchronization of an industrial internet field broadband bus according to some embodiments of the disclosure.

Here FIG. 4 illustrates the time slices in to which the transmission period of time available over the bus are segmented, where the available transmission period of time is segmented periodically into one synchronization time slice and several data time slices, and then the synchronization time slice is dedicated to transmission of a synchronization message. Stated otherwise, the bus controller 201 and the respective bus terminals 202 can transmit the data in their respective time slices over the Ethernet upon being temporally triggered, and as illustrated in FIG. 5, the bus controller waits for a synchronization time slice in the calculation algorithm in the IEEE1588 clock protocol, and if there is a synchronization time slice arriving, then the bus controller will initiate a synchronization message, and record timestamp information concerning when the synchronization message is transmitted, so that the respective bus terminals can receive the synchronization message, and so on, where the bus controller further waits for the next synchronization time slice, and then initiates synchronization in the next periodicity.

Here in some embodiments, the precise clock synchronization protocol can be the IEEE1588 protocol, and of course, they can alternatively be synchronized in clock in another protocol capable of precise clock synchronization, so some embodiments of the disclosure will not be limited thereto.

Here in some embodiments, in a real application, data over a broadband bus can include real-time data and non-real-time data, where the real-time data require highly temporally deterministic and timely data transmission, and the non-real-time data require less temporally deterministic and timely data transmission, so that in some embodiments of the disclosure, the data can be segmented in advance into real-time data and non-real-time data so that different transmission strategies are applied to the different data. Since a synchronization message is required to be highly real time, the synchronization message can be added to the real-time data container of the bus controller, and the bus controller can determine whether the bus controller operates in its synchronization time slice, and if so, then the bus controller will retrieve the synchronization message from the real-time data container of the bus controller as data to be transmitted, and transmit the synchronization message.

Furthermore the bus controller allocates the data time slices for the bus controller and the respective bus terminals. If the data to be transmitted in the data time slices are configuration information for the bus controller to configure the respective bus terminals, then the data to be transmitted will be a message with a destination address being the IP addresses of the bus terminals corresponding to the configuration information.

Then the bus controller determines whether the configuration information is real-time data, and if so, then the bus controller will transmit the configuration information in the data time slices using Time-Triggered Ethernet (TTE) or the Time Division Multiple Access (TDMA);

Otherwise, the bus controller will transmit the configuration information using CSMA/CD collision detection.

In some embodiments, the bus controller determines whether a data identifier of the data to be transmitted is a data identifier of real-time data, and if so, then the data to be transmitted will be real-time data; otherwise, then the data to be transmitted will be non-real-time data, and the bus controller will store the real-time data into the real-time data container, and the non-real-time data into the non-real-time data container.

Furthermore the bus controller determines whether the bus controller operates in its data time slice, and if so, then the bus controller will retrieve the configuration information from the real-time data container of the bus controller in the time slice as data to be transmitted, and transmit the configuration information.

In the industrial internet field broadband bus architecture system according to some embodiments of the disclosure, the bus controller 201 and the respective bus terminals 202 are synchronized in clock through the precise clock synchronization protocol, and the bus controller 201 allocates the time slices for the bus controller 201 and the respective bus terminals 202 so that the bus controller 201 and the respective bus terminals 202 transmit the synchronization messages in the synchronization time slices to thereby synchronize in clock the respective devices so as to ensure timely and temporally deterministic data transmission. Thus some embodiments of the disclosure provide a high-performance, highly reliable and highly real-time industrial internet field broadband bus architecture system. Moreover a transmission medium of the two-wire data transfer network can be a twisted pair or a shielded twisted pair so that the system according to some embodiments of the disclosure can be applicable to a traditional industry control facility using a bus, and thus can be highly universally applicable.

Figure 6:
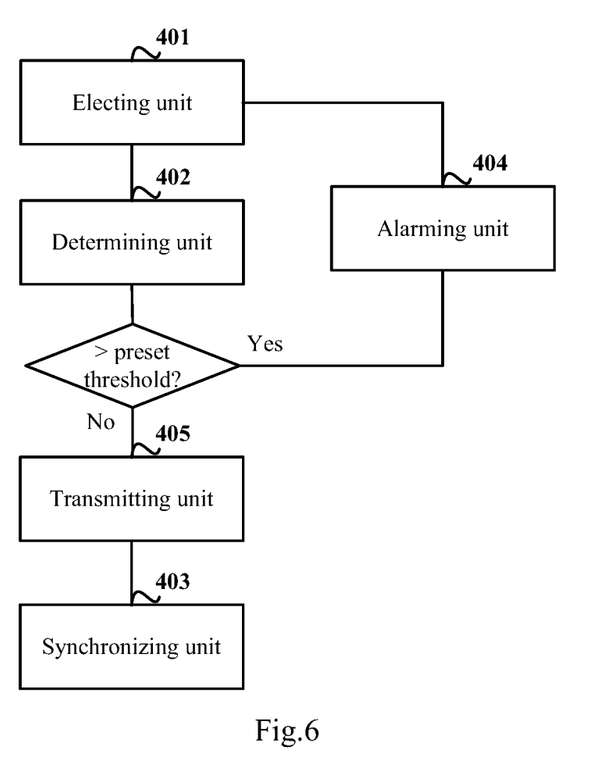
FIG. 6 illustrates a schematic structural diagram of an apparatus for clock synchronization of an industrial internet field broadband bus according to some embodiments of the disclosure.

Based upon the same inventive idea, some embodiments of the disclosure further provide an apparatus for clock synchronization in industry process control, where the apparatus can implement some embodiments of the method above. The apparatus according to some embodiments of the disclosure as illustrated in FIG. 6 includes an electing unit 401, a determining unit 402, and a synchronizing unit 403, where:

The electing unit 401 is configured to elect one of a bus controller and respective bus terminals as a best master clock;

The determining unit 402 is to determine whether an IP address of the device of the best master clock is the same as an IP address of the bus controller; and The synchronizing unit 403 is, if so, to determine the bus controller as a master device of clock synchronization, and to transmit by the bus controller a synchronization message to the respective bus terminals for clock synchronization; otherwise, to return to the step of electing one of the bus controller and the respective bus terminals as the best master clock.

Furthermore the determining unit 402 is configured to transmit the IP address of the device of the best master clock to the bus controller, so that the bus controller compares the IP address of the device of the best master clock with the IP address of the bus controller for consistency; or The device of the best master clock compares its own IP address with an IP address of the bus controller for consistency.

Furthermore the electing unit 401 is configured to elect one of the bus controller and the respective bus terminals as the best master clock using a best master clock algorithm in the IEEE1588 clock protocol.

Here a transmission period of time available over a bus in a two-wire data transfer network are segmented into synchronization time slices and data time slices; and the synchronizing unit 403 is configured to transmit by the bus controller the synchronization message to the respective bus terminals in the synchronization time slices, where the synchronization message carries a timestamp concerning when the synchronization message is transmitted, so that the respective bus terminals are synchronized in clock according to the timestamp, where the timestamp is derived using a clock of the bus controller.

The synchronizing unit 403 is configured to determine by the bus controller whether the bus controller operates in its synchronization time slice, and if so, to retrieve the synchronization message from a real-time data container of the bus controller in the time slice as data to be transmitted, and to transmit the synchronization message.

Furthermore the apparatus further includes an alarming unit 404 is configured to stop the best master clock from being elected, and to transmit by the bus controller an alarm for calibrating a clock source, if the best master clock is elected for a number of times above a preset threshold.

Here the bus controller allocates the data time slices for the bus controller and the respective bus terminal.

Furthermore if the data to be transmitted in the data time slices are configuration information for the bus controller to configure the respective bus terminals, then the data to be transmitted will be a message with a destination address being IP addresses of the bus terminals corresponding to the configuration information.

Furthermore the transmitting unit 405 is configured to determine whether the configuration information is real-time data; and If so, to transmit the configuration information in the data time slices using Time-Triggered Ethernet (TTE) or the Time Division Multiple Access (TDMA);

If not so, to transmit the configuration information using CSMA/CD collision detection.

Furthermore the transmitting unit 405 is configured to determine whether the bus controller operates in its data time slice, and if so, to retrieve the configuration information from the real-time data container of the bus controller in the time slice as data to be transmitted, and to transmit the configuration information.

In summary, in some embodiments of the disclosure, the bus controller and the respective bus terminals are synchronized in clock through the precise clock synchronization protocol, that is, one of the bus controller and the respective bus terminals is elected as the device of the best master clock, and the IP address of the device of the best master clock is compared with the IP address of the bus controller for consistency; and if they are consistent, then the bus controller will be determined as the master device of clock synchronization, and the synchronization message will be transmitted by the bus controller to the respective bus terminals for clock synchronization; otherwise, the process will return to the first step until the elected best master clock is the bus controller, so that although the master clock is elected for a number of times, it will be set as the bus controller all the time instead of being adjusted frequently, so the clock of the system will be relatively stable, and the bus controller and the respective bus terminal will be synchronized in clock to thereby ensure real-time data transmission.

The disclosure has been described in a flow chart and/or a block diagram of the method, the device (system) and the computer program product according to some embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of booting the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for clock synchronization of an industrial internet field broadband bus, wherein the method is applicable to an industrial internet field broadband bus architecture system comprising a bus controller and at least one bus terminal, the bus controller is connected with the bus terminal over a two-wire data transfer network, and the method comprises steps of:

electing one of the bus controller and the bus terminal as a best master clock;

determining whether an Internet Protocol (IP) address of the device of the best master clock is the same as an IP address of the bus controller; and when the IP address of the device of the best master clock is the same as the IP address of the bus controller, then determining the bus controller as a master device of clock synchronization, and transmitting, by the bus controller, a synchronization message to the bus terminal for clock synchronization; or when the IP address of the device of the best master clock is not the same as the IP address of the bus controller, returning to the step of electing one of the bus controller and the bus terminal as the best master clock;

wherein the method further comprises:

segmenting a transmission period of time available over a bus in the two-wire data transfer network into synchronization time slices and data time slices;

wherein transmitting, by the bus controller, the synchronization message to the bus terminal for clock synchronization comprises:

transmitting, by the bus controller, the synchronization message to the bus terminal in the synchronization time slices, wherein the synchronization message carries a timestamp concerning when the synchronization message is transmitted, so that the bus terminal is synchronized in clock according to the timestamp, wherein the timestamp is derived using a clock of the bus controller; and wherein transmitting, by the bus controller, the synchronization message to the bus terminal in the synchronization time slices comprises:

determining, by the bus controller, whether the bus controller operates in its synchronization time slice, and when the bus controller operates in its synchronization time slice, then retrieving the synchronization message from a real-time data container of the bus controller in the synchronization time slice, and transmitting the synchronization message.

2. The method according to claim 1, wherein determining whether the IP address of the device of the best master clock is the same as the IP address of the bus controller comprises:

transmitting the IP address of the device of the best master clock to the bus controller, and comparing, by the bus controller, the IP address of the device of the best master clock with the IP address of the bus controller for consistency; or comparing, by the device of the best master clock, the IP address of the device of the best master clock with the IP address of the bus controller for consistency.

3. The method according to claim 1, after returning to the step of electing one of the bus controller and the at least one bus terminal as the best master clock, further comprising:
when a quantity of times for selecting the best master clock is above a preset threshold, then stopping electing the best master clock, and transmitting, by the bus controller, an alarm for calibrating a clock source.

4. The method according to claim 1, wherein electing one of the bus controller and the bus terminal as the best master clock comprises:
electing one of the bus controller and the bus terminal as the best master clock through a best master clock algorithm in an Institute of Electrical and Electronics Engineers (IEEE) 1588 clock protocol.

5. The method according to claim 1, further comprising: allocating, by the bus controller, the data time slices for the bus controller and the bus terminal.

6. The method according to claim 5, wherein:
when data to be transmitted in the data time slices is configuration information for the bus controller to configure the bus terminal, then the data to be transmitted is a message having a destination address being an IP address of the bus terminals corresponding to configuration information.

7. The method according to claim 6, further comprising: determining, by the bus controller, whether the configuration information is real-time data; and
when the configuration information is real-time data, then transmitting the configuration information in the data time slices using a Time-Triggered Ethernet (TTE) or using a Time Division Multiple Access (TDMA); or
when the configuration information is not real-time data, transmitting the configuration information using carrier-sense multiple access with collision detection (CSMA/CD).

8. The method according to claim 6, wherein transmitting the configuration information using the TTE comprises:
determining, by the bus controller, whether the bus controller operates in its data time slice, and when the bus controller operates in its data time slice, then retrieving the configuration information from the real-time data container of the bus controller in the data time slice as the data to be transmitted, and transmitting the configuration information.

9. A method for clock synchronization of an industrial internet field broadband bus, wherein the method is applicable to an industrial internet field broadband bus architecture system comprising a bus controller and at least one bus terminal, the bus controller is connected with the bus terminal over a two-wire data transfer network, and the method comprises steps of:
electing one of the bus controller and the bus terminal as a best master clock;
determining whether an Internet Protocol (IP) address of the device of the best master clock is the same as an IP address of the bus controller; and
when the IP address of the device of the best master clock is the same as the IP address of the bus controller, then determining the bus controller as a master device of clock synchronization, and transmitting, by the bus controller, a synchronization message to the bus terminal for clock synchronization; or
when the IP address of the device of the best master clock is not the same as the IP address of the bus controller, returning to the step of electing one of the bus controller and the bus terminal as the best master clock;
wherein the method further comprises:
segmenting a transmission period of time available over a bus in the two-wire data transfer network into synchronization time slices and data time slices;
wherein transmitting, by the bus controller, the synchronization message to the bus terminal for clock synchronization comprises:
transmitting, by the bus controller, the synchronization message to the bus terminal in the synchronization time slices, wherein the synchronization message carries a timestamp concerning when the synchronization message is transmitted, so that the bus terminal is synchronized in clock according to the timestamp, wherein the timestamp is derived using a clock of the bus controller; and
wherein determining whether the IP address of the device of the best master clock is the same as the IP address of the bus controller comprises:
transmitting the IP address of the device of the best master clock to the bus controller, and comparing, by the bus controller, the IP address of the device of the best master clock with the IP address of the bus controller for consistency; or
comparing, by the device of the best master clock, the IP address of the device of the best master clock with the IP address of the bus controller for consistency.

10. A method for clock synchronization of an industrial internet field broadband bus, wherein the method is applicable to an industrial internet field broadband bus architecture system comprising a bus controller and at least one bus terminal, the bus controller is connected with the bus terminal over a two-wire data transfer network, and the method comprises steps of:
electing one of the bus controller and the bus terminal as a best master clock;
determining whether an Internet Protocol (IP) address of the device of the best master clock is the same as an IP address of the bus controller; and
when the IP address of the device of the best master clock is the same as the IP address of the bus controller, then determining the bus controller as a master device of clock synchronization, and transmitting, by the bus controller, a synchronization message to the bus terminal for clock synchronization; or
when the IP address of the device of the best master clock is not the same as the IP address of the bus controller, returning to the step of electing one of the bus controller and the bus terminal as the best master clock;
wherein the method further comprises:
segmenting a transmission period of time available over a bus in the two-wire data transfer network into synchronization time slices and data time slices; and
after returning to the step of electing one of the bus controller and the bus terminal as the best master clock, the method further comprises:
when a quantity of times for selecting the best master clock is above a preset threshold, then stopping electing the best master clock, and transmitting, by the bus controller, an alarm for calibrating a clock source;

wherein transmitting, by the bus controller, the synchronization message to the bus terminal for clock synchronization comprises:
transmitting, by the bus controller, the synchronization message to the bus terminal in the synchronization time slices, wherein the synchronization message carries a timestamp concerning when the synchronization message is transmitted, so that the bus terminal is synchronized in clock according to the timestamp, wherein the timestamp is derived using a clock of the bus controller.

11. The method according to claim 9, further comprising: allocating, by the bus controller, the data time slices for the bus controller and the bus terminal.

12. The method according to claim 11, wherein:
when data to be transmitted in the data time slices is configuration information for the bus controller to configure the bus terminal, then the data to be transmitted is a message having a destination address being an IP address of the bus terminal corresponding to configuration information.

13. The method according to claim 12, further comprising:
determining, by the bus controller, whether the configuration information is real-time data; and
when the configuration information is real-time data, then transmitting the configuration information in the data time slices using a Time-Triggered Ethernet (TTE) or using a Time Division Multiple Access (TDMA); or
when the configuration information is not real-time data, transmitting the configuration information using carrier-sense multiple access with collision detection (CSMA/CD).

14. The method according to claim 12, wherein transmitting the configuration information using the TTE comprises:
determining, by the bus controller, whether the bus controller operates in its data time slice, and when the bus controller operates in its data time slice, then retrieving the configuration information from the real-time data container of the bus controller in the data time slice as the data to be transmitted, and transmitting the configuration information.

15. The method according to claim 10, further comprising: allocating, by the bus controller, the data time slices for the bus controller and the bus terminal.

16. The method according to claim 15, wherein:
when data to be transmitted in the data time slices is configuration information for the bus controller to configure the bus terminal, then the data to be transmitted is a message having a destination address being an IP address of the bus terminal corresponding to configuration information.

17. The method according to claim 16, further comprising:
determining, by the bus controller, whether the configuration information is real-time data; and
when the configuration information is real-time data, then transmitting the configuration information in the data time slices using a Time-Triggered Ethernet (TTE) or using a Time Division Multiple Access (TDMA); or
when the configuration information is not real-time data, transmitting the configuration information using carrier-sense multiple access with collision detection (CSMA/CD).

18. The method according to claim 16, wherein transmitting the configuration information using the TTE comprises:
determining, by the bus controller, whether the bus controller operates in its data time slice, and when the bus controller operates in its data time slice, then retrieving the configuration information from the real-time data container of the bus controller in the data time slice as the data to be transmitted, and transmitting the configuration information.

\* \* \* \* \*